US011165740B2

(12) United States Patent
Chen et al.

(10) Patent No.: US 11,165,740 B2
(45) Date of Patent: Nov. 2, 2021

(54) MESSAGE SENDING METHOD AND TERMINAL DEVICE

(71) Applicant: ALIBABA GROUP HOLDING LIMITED, Grand Cayman (KY)

(72) Inventors: Jianfeng Chen, Hangzhou (CN); Qiang Lin, Hangzhou (CN); Zhoufeng Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/138,856

(22) Filed: Sep. 21, 2018

(65) Prior Publication Data
US 2019/0028422 A1 Jan. 24, 2019

Related U.S. Application Data

(63) Continuation of application No. PCT/CN2017/076400, filed on Mar. 13, 2017.

(30) Foreign Application Priority Data

Mar. 23, 2016 (CN) .......................... 201610169460.6

(51) Int. Cl.
*H04L 12/58* (2006.01)
(52) U.S. Cl.
CPC .............. *H04L 51/34* (2013.01); *H04L 51/24* (2013.01); *H04L 51/16* (2013.01)
(58) Field of Classification Search
CPC ......... H04L 51/34; H04L 51/24; H04L 51/16; H04L 67/2852
See application file for complete search history.

(56) References Cited

U.S. PATENT DOCUMENTS

| | | | | |
|---|---|---|---|---|
| 5,956,340 A | * | 9/1999 | Afek | ...................... H04L 47/30 370/412 |
| 6,058,389 A | * | 5/2000 | Chandra | ............... G06F 16/252 |
| 7,366,831 B2 | * | 4/2008 | Saha | ......................... G06F 5/14 711/110 |
| 7,644,197 B1 | * | 1/2010 | Waldorf | .................. G06F 9/544 710/21 |

(Continued)

FOREIGN PATENT DOCUMENTS

| | | |
|---|---|---|
| CN | 101094098 A | 12/2007 |
| CN | 101741729 A | 6/2010 |

(Continued)

OTHER PUBLICATIONS

PCT International Search Report issued in International Application No. PCT/CN2017/076400, dated May 27, 2017 (4 pages).

(Continued)

*Primary Examiner* — Jimmy H Tran
(74) *Attorney, Agent, or Firm* — Finnegan, Henderson, Farabow, Garrett & Dunner, LLP

(57) ABSTRACT

Embodiments of the present disclosure provide to a message management method and apparatus. The message management method includes: recording, in a memory, a number range of consumable messages in a message queue, wherein the number range includes numberings of the consumable messages; and adjusting the number range and managing the messages according to status changes of the messages in the message queue.

21 Claims, 9 Drawing Sheets

(56) References Cited

U.S. PATENT DOCUMENTS

| | | | | |
|---|---|---|---|---|
| 7,676,580 | B2* | 3/2010 | Hill | G06F 9/546 709/227 |
| 7,917,606 | B2* | 3/2011 | Dettinger | G06F 9/546 709/216 |
| 8,199,752 | B2* | 6/2012 | Swanson | H04L 29/08081 370/389 |
| 9,246,836 | B2* | 1/2016 | Biswas | H04L 47/624 |
| 9,372,879 | B1* | 6/2016 | Evenson | G06F 16/9027 |
| 9,436,532 | B1* | 9/2016 | Chandrasekaran | G06F 9/546 |
| 9,578,120 | B1* | 2/2017 | Evenson | H04L 51/26 |
| 10,051,038 | B2* | 8/2018 | Makhervaks | H04L 45/24 |
| 2004/0034664 | A1* | 2/2004 | Jain | G06F 16/2365 |
| 2004/0205781 | A1* | 10/2004 | Hill | G06F 9/546 719/328 |
| 2004/0230659 | A1* | 11/2004 | Chase | H04L 51/18 709/206 |
| 2005/0256931 | A1* | 11/2005 | Follmeg | H04L 12/1859 709/206 |
| 2005/0262215 | A1* | 11/2005 | Kirov | G06Q 10/107 709/207 |
| 2006/0059238 | A1* | 3/2006 | Slater | H04L 51/12 709/206 |
| 2006/0218194 | A1* | 9/2006 | Yalamanchi | G06F 40/137 |
| 2006/0248145 | A1* | 11/2006 | Karmakar | H04L 51/30 709/206 |
| 2006/0271784 | A1* | 11/2006 | Bolosky | H04L 51/12 713/170 |
| 2007/0076735 | A1* | 4/2007 | Soo | G06F 13/385 370/412 |
| 2007/0079071 | A1* | 4/2007 | Saha | G06F 5/14 711/118 |
| 2008/0098406 | A1* | 4/2008 | Quick | G06Q 10/107 719/314 |
| 2008/0147819 | A1* | 6/2008 | Dettinger | G06F 9/546 709/206 |
| 2008/0222255 | A1* | 9/2008 | Hall | G06F 9/546 709/206 |
| 2008/0294648 | A1* | 11/2008 | Lin | G06F 16/2343 |
| 2009/0132671 | A1* | 5/2009 | Chkodrov | H04L 51/00 709/206 |
| 2010/0124234 | A1* | 5/2010 | Post | H04L 47/527 370/412 |
| 2011/0082916 | A1* | 4/2011 | Swanson | H04L 45/125 709/219 |
| 2012/0221444 | A1* | 8/2012 | Bowes | G06Q 30/016 705/30 |
| 2012/0250762 | A1* | 10/2012 | Kaye | H04L 47/25 375/240.07 |
| 2013/0066977 | A1* | 3/2013 | Katti | H04L 51/26 709/206 |
| 2014/0064291 | A1* | 3/2014 | Biswas | H04L 47/624 370/412 |
| 2014/0075446 | A1* | 3/2014 | Wang | G06F 21/40 718/104 |
| 2014/0310369 | A1* | 10/2014 | Makhervaks | G06F 13/14 709/207 |
| 2014/0372702 | A1* | 12/2014 | Subramanyam | G06F 12/0848 711/129 |
| 2015/0370860 | A1* | 12/2015 | Bender | G06F 16/2365 707/609 |
| 2016/0043983 | A1* | 2/2016 | Bishop | H04L 51/16 709/206 |
| 2016/0050157 | A1* | 2/2016 | Abbott | H04L 47/365 709/223 |
| 2017/0078367 | A1* | 3/2017 | Dress | H04L 12/40163 |
| 2017/0078385 | A1* | 3/2017 | Dress | H04L 12/40163 |
| 2017/0171131 | A1* | 6/2017 | Steiner | H04L 51/02 |
| 2017/0171132 | A1* | 6/2017 | Steiner | H04L 51/26 |
| 2018/0060145 | A1* | 3/2018 | Jaiswal | G06F 9/546 |
| 2018/0081745 | A1* | 3/2018 | Jaiswal | G06F 9/546 |

FOREIGN PATENT DOCUMENTS

| | | |
|---|---|---|
| CN | 101763289 A | 6/2010 |
| CN | 102902512 A | 1/2013 |
| CN | 103984734 A | 8/2014 |
| CN | 104915248 A | 9/2015 |
| CN | 105407152 A | 3/2016 |
| WO | WO 2013/143285 A1 | 3/2013 |
| WO | WO 2017/162059 A1 | 9/2017 |

OTHER PUBLICATIONS

First Chinese Office Action issued in Chinese Application No. 201610169460.6 dated Dec. 26, 2019, 15 pages.

First Chinese Search Report issued in corresponding Chinese Application No. 201610169460.6 dated Dec. 16, 2019 (2 pages).

* cited by examiner

MESSAGE SENDING METHOD AND TERMINAL DEVICE

CROSS REFERENCE TO RELATED APPLICATION

The disclosure claims the benefits of priority to International application number PCT/CN2017/076400, filed Mar. 13, 2017, and Chinese application number 201610169460.6, filed Mar. 23, 2016, both of which are incorporated herein by reference in their entireties.

BACKGROUND

In cloud computing, message management is a very important. The message management can affect performance of a cloud computing system. When a message is being processed, a message producer (which can also be referred to as a client terminal) writes a produced message to a disk. When a cache is empty, a pre-reading operation can be triggered to pre-read the message from the disk to the cache. A message consumer (which can also be referred to as a client terminal) can read the message from the cache for consumption. If the message fails to be consumed, the message can be revived to the disk.

A reliable message system persists a read status of a message at a server end, to ensure that the message can be "consumed at least once". Reliability of a message represents that a message is persisted onto a disk after entering the message queue, so as to ensure that the message will not be lost due to power failure. "Consumed at least once" means a message will be deleted by a user actively only after it has been successfully consumed; otherwise it can be consumed all the time. When a message is deleted, the message is marked as consumed by a user actively. At a same time, it is necessary to return to a message that first enters a current message queue to ensure the first-in first-out (FIFO) characteristic of the message queue, where a message that enters the queue first will be consumed first. A message number (i.e., a message ID) can be assigned to each message entering the message queue, and the message numbers can be sorted according to a sequence of the messages entering the message queue. If a message is not successfully consumed, it may enter the message queue once again to ensure that it can be consumed again. As such, a message entering the message queue first currently can dynamically change.

Conventionally, a message entering the queue first can be acquired by: adding two attributes to metadata information of the message, wherein one attribute is used to record whether the message has been successfully consumed, and the other attribute records the location of the next message. A consumption status of the message can be set to be "unconsumed" when the message is sent to the message system. The status of the message can be set to be "being consumed" after a user acquires the message. After the user has successfully consumed the message, the status of the message can be actively set to be "consumed" by the user. The server end can record the location of the first "unconsumed" message in the current system. In order to implement an FIFO scheme, the messages need to be consumed sequentially, and the concurrent consumption cannot be supported, thus limiting the processing speed of the messages. Moreover, modifications of the attribute of the message may further result in random write of a disk, which affects the performance of the system seriously.

Also conventionally, the message entering the queue first can be acquired by dividing a message queue into a "message queue unconsumed" part and a "message queue being consumed" part. A message can enter the "message queue unconsumed" part after it has been sent to the system. After a user acquires the message, the message is moved out from the "message queue unconsumed" part and enters the "message queue being consumed" part. After the message is successfully consumed, the user can actively delete the message from the "message queue being consumed" part. Otherwise, after an appointed period of time, the system can move the message from the "message queue being consumed" part to the tail of the "message queue unconsumed", making the message consumable again to ensure that the message can be consumed at least once. When the consumption of the message fails, the system may add the message to the tail of the "message queue unconsumed" again, which will seriously affect the first-in first-out characteristic of the message.

SUMMARY OF THE DISCLOSURE

Embodiments of the disclosure provide a message management method. The method can include: recording, in a memory, a number range of consumable messages in a message queue, wherein the number range includes numberings of the consumable messages; and adjusting the number range and managing the messages according to status changes of the messages in the message queue.

Embodiments of the disclosure further provide a message management apparatus. The apparatus can include: a memory storing a set of instructions; and a processor configured to execute the set of instructions to cause the message management apparatus to perform: recording, in the memory, a number range of consumable messages in a message queue, wherein the number range includes numberings of the consumable messages; and adjusting the recorded number range and managing the messages according to status changes of the messages in the message queue.

Embodiments of the disclosure also provide a message pre-reading method. The method can include: querying a number range of consumable messages in a message queue recorded in a memory; determining, among the consumable messages, a plurality of selected consumable messages, wherein the selected consumable messages include smaller numberings than other consumable messages in the message queue; and reading the selected consumable messages to a cache from the message queue according to the numberings of the selected consumable messages.

Embodiments of the disclosure also provide a message pre-reading apparatus. The apparatus can include: a memory storing a set of instructions; and a processor configured to execute the set of instructions to cause the apparatus to: query a number range of consumable messages in a message queue; determine, among the consumable messages, a plurality of selected consumable messages, wherein the selected consumable messages include smaller numberings than other consumable messages in the message queue; and read the selected consumable messages to a cache from the message queue according to the numberings of the selected consumable messages.

Embodiments of the disclosure also provide a non-transitory computer readable medium that stores a set of instructions that is executable by at least one processor of a computer system to cause the computer system to perform a message management method. The method can include: recording, in a memory, a number range of consumable messages in a message queue, wherein the number range includes numbers of the consumable messages; and adjusting the number range and managing the messages according to status changes of the messages in the message queue.

DETAILED DESCRIPTION

The principle and features of the present disclosure are described below with reference to the accompanying drawings. The embodiments are used only to explain the present disclosure, but not to limit the scope of the present disclosure. For those of ordinary skill in the art, all embodiments derived based on the spirit of the present disclosure without making creative efforts fall within the protection scope of the present disclosure.

An objective of the present invention is to provide a message management method and apparatus, and a message pre-reading method and apparatus, which increase a message pre-reading speed and improve system performance while ensuring a first-in first-out characteristic of messages.

Figure 1:
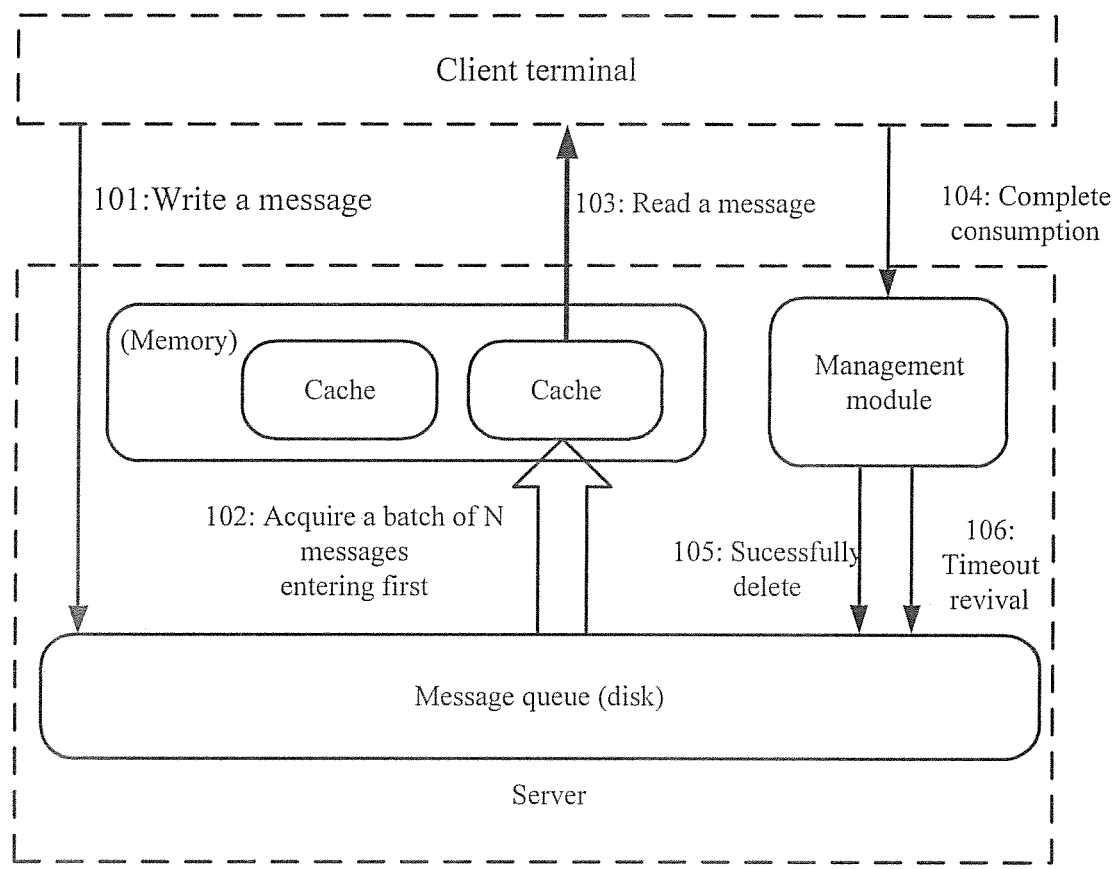
FIG. 1 is a schematic diagram of an exemplary message processing procedure, according to some embodiments of the disclosure.

FIG. 1 is a schematic diagram of a message processing procedure, according to embodiments of the disclosure.

As shown in FIG. 1, a client terminal can write (101) a generated message to a disk, and the message enters a message queue.

When a cache is empty, a batch of N messages entering the message queue first can be acquired (102) from the disk to the cache. This is a message pre-reading operation.

Messages can be read (103) from the cache for the client terminal to consume, and a message that has been read can be marked as an inconsumable message in the message queue.

Upon completion of the consumption (104), the client terminal can return a consumption result to a server.

A management module can process a message in the disk according to the consumption result. If the message is successfully consumed, the message in the message queue can be deleted (105). If the client terminal has not returned information indicating successful message consumption within a given period of time, it is considered that consumption of the message has failed. The message can be revived (106), and the message in the message queue can be marked as a consumable message.

In the message processing procedure, a number range of consumable messages in the message queue can be recorded in a memory by using a cursor.

Figure 2:
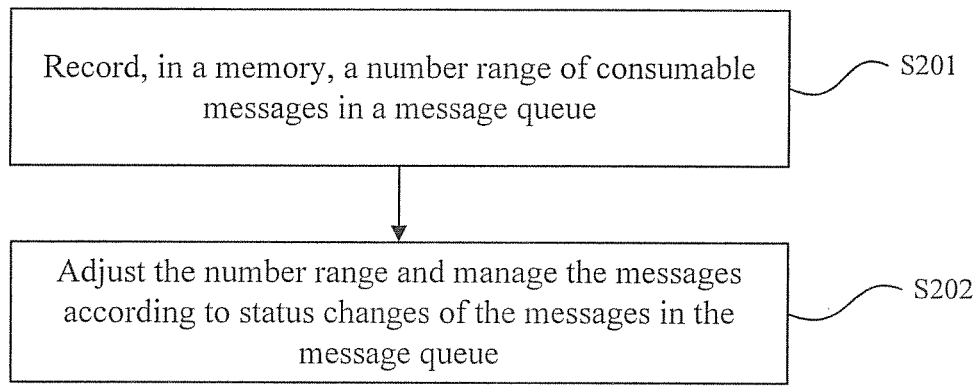
FIG. 2 is a flowchart of an exemplary message management method, according to some embodiments of the disclosure.

FIG. 2 is a flowchart of an exemplary message management method, according to embodiments of the disclosure. As shown in FIG. 2, the message management method can include steps S201 and S202.

In step S201, a number range of consumable messages in a message queue can be recorded in a memory. The number range can include at least one number interval, and any two number intervals do not overlap with each other. A message numbering represents a sequence of a message entering a message queue. A smaller numbering of a message indicates the message enters the message queue earlier. For example, message 10 is the $10^{th}$ message entering the message queue.

As the number range of the consumable messages is recorded according to a sequence of message numberings, a first-in-first-out characteristic of the messages can be ensured. The number range of the consumable messages can be used as a basis for querying a batch of messages to be pre-read. Through the number range of the consumable messages, a batch of messages to be pre-read to a cache can be found quickly, and the first-in first-out characteristic of the messages can also be ensured.

In some embodiments of the present disclosure, number intervals in the number range can be arranged in an ascending order of interval right endpoint message numberings. In other words, the number intervals can be arranged in an ascending order according to a rightmost message numbering in the interval. In this disclosure, such a number range can be referred to as a cursor domain set, and a number interval in such a number range can be referred to as a cursor domain. A cursor domain is expressed by a left closed and right open interval.

In this disclosure, message numberings at two endpoints of a number interval in the number range can be referred to as a left endpoint message numbering and a right endpoint message numbering respectively.

It is appreciated that the number range can be expressed in other forms as long as the form can indicate the number range of the consumable messages in the message queue and can indicate a numbering sequence of these consumable messages. As such, it can be ensured that consumable messages in a message queue can be found through the number range, and these consumable messages can be taken out for consumption according to the first-in first-out characteristic.

In the following, the number range of the consumable messages in the message queue is referred to as the number range for short.

In step S202, the number range can be adjusted and the messages can be managed according to status changes of the messages in the message queue. In some embodiments of the present disclosure, adjusting the number range and managing the messages according to status changes of the messages in the message queue may further include: narrowing the number range after a message in the message queue pre-read to a cache is removed from the cache and is consumed by a client terminal, removing a numbering of the removed message from the number range, and marking the removed message as an inconsumable message in the message queue. For example, an initial status of a number range is {[1, 101]}, messages in a message queue that are pre-read to a cache include 10 messages from message 1 to message 10. After the 10 messages are read from the cache, the number range {[1,101]} is narrowed to {[11,101]}, so that the numberings of the 10 messages from message 1 to message 10 are removed from the number range of the consumable messages.

Messages read by a message consumer from the cache can enter an inactive message queue, and be classified as inactive messages. Active messages are messages that can be consumed, inactive messages are messages being consumed by the user. If these messages are consumed successfully, these messages can be further classified as inconsumable messages and removed from the range of consumable messages. Here, all messages read from the cache are processed on the assumption that they are consumed successfully. If consumption of a message fails, the message can be added to the range of consumable messages through a subsequent revival mechanism.

In embodiments of the present disclosure, adjusting the number range and managing the messages according to status changes of the messages in the message queue can further include: expanding the number range when a client terminal does not return a consumption result of a message within a given period of time. Thus, the numbering of the message whose consumption result is not returned within a given period of time can be included in the number range, and the message whose consumption result is not returned within a given period of time can be marked as a consumable message in the message queue. Utile client terminal does not return a consumption result within a given period of time, the message consumption may be considered as failed. Therefore, a message whose consumption result is not returned within a given period of time is referred to as a message that fails to be consumed. This is a revival mechanism for the message that fails to be consumed. The numbering of the message that fails to be consumed can be included in the number range, so that the message can be consumed once again, and the message can be consumed according to the first-in-first-out characteristic.

Here, a cursor domain set is taken as an example to explain the case where the number range of consumable messages is expanded due to a message consumption failure. In some embodiments, when a message in the message queue fails to be consumed, expanding the number range to include the numbering of the message that fails to be consumed in the number range can further include additional steps a-g as below.

In step a, after a message that fails to be consumed is determined to be a message to be revised, a message identification (ID) of a message to be revived is MsgID. An upper-bound cursor domain of a cursor domain [MsgID, MsgID+1] in a cursor domain set can be located according to MsgID, and the upper-bound cursor domain can be recorded as [Upper_BeginID, Upper_EndID]. The upper-bound cursor domain of MsgID refers to the first cursor domain, whose right endpoint message numbering is greater than MsgID+1, in the cursor domain set.

In step b, if the upper-bound cursor domain [Upper_BeginID, Upper_EndID] has already included MsgID, the process is ended, and the cursor domain may not be adjusted.

In step c, if the left endpoint message numbering Upper_BeginID of the upper-bound cursor domain is greater than MsgID, the cursor domain set can be adjusted to cover MsgID.

In step d, a precursor cursor domain [Pre_BeginID, Pre_EndID] of the message MsgID can be acquired, wherein the precursor cursor domain of the message MsgID refers to the first cursor domain, whose right endpoint message numbering is less than MsgID+1, in the cursor domain set.

In step e, if the precursor cursor domain of the message MsgID does not exist, [MsgID, MsgID+1] can be added to the cursor domain set, and the process can be ended.

In step f, if the precursor cursor domain of the message MsgID exists, a cursor domain which has a smaller range between the cursor domain [Pre_BeginID, MsgID+1] and the cursor domain [MsgID, Upper_EndID] and does not exceed MAX_RANGE_SIZE can be added to the cursor domain set, to replace the precursor cursor domain or the upper-bound cursor domain. For example, if the range of the cursor domain [Pre_BeginID, MsgID+1] is smaller, [Pre_BeginID, MsgID+1] can be used to replace the precursor cursor domain [Pre_BeginID, Pre_EndID], and if the range of the cursor domain[MsgID, Upper_EndID] is smaller, [MsgID, Upper_EndID] can be used to replace the upper-bound cursor domain [Upper_BeginID, Upper_EndID]), wherein MAX_RANGE_SIZE is a preset maximum range of the cursor domain.

In step g, if the precursor cursor domain of the message MsgID exists and the ranges of the cursor domain [Pre_BeginID, MsgID+1] and the cursor domain [MsgID, Upper_EndID] both exceed MAX_RANGE_SIZE, [MsgID, MsgID+1] can be added to the cursor domain set.

Figure 3:
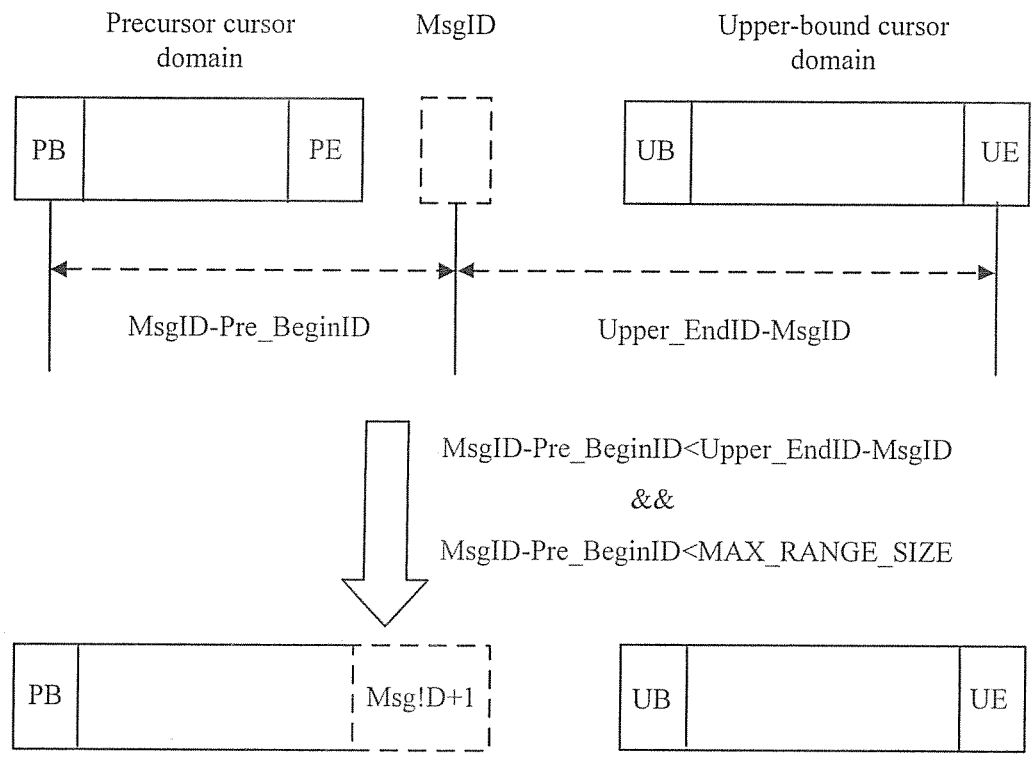
FIG. 3 is a schematic diagram of expansion of a precursor cursor domain of a message MsgID when the message MsgID is revived.

Furthermore, in step f, if the scale of the cursor domain set reaches an upper limit (e.g., the maximum scale of the cursor domain set, expressed with MAX_COUNT), no new cursor domain can be added, and the upper-bound cursor domain or the precursor cursor domain is selected to expand. For example, if the upper-bound cursor domain is the maximum cursor domain, only its precursor cursor domain can be expanded. That is, in the case where MsgID−Pre_BeginID<Upper_EndID−MsgID and MsgID−Pre_BeginID<MAX_RANGE_SIZE, the precursor cursor domain is expanded to be [Pre_BeginID, MsgID+1), as shown in FIG. 3. FIG. 3 is a schematic diagram of expansion of a precursor cursor domain of a message MsgID when the message MsgID is revived. In FIG. 3, PB represents Pre_BeginID, PE represents Pre_EndID, UB represents Upper_BeginID, and UE represents Upper_EndID. MAX_COUNT represents the total number of cursor domains that can be included in the cursor domain set at most.

In step f, if the ranges of the cursor domain [Pre_BeginID, MsgID+1) and the cursor domain [MsgID, Upper_EndID) are the same and do not exceed MAX_RANGE_SIZE, the cursor domain [Pre_BeginID, MsgID+1) can be selected randomly to replace the precursor cursor domain. Or [MsgID, Upper_EndID) can be selected to replace the upper-bound cursor domain, and the cursor domain [Pre_BeginID, MsgID+1) can also be selected to replace the precursor cursor domain by default.

In Example 1 to Example 4 below, it is assumed that MAX_RANGE_SIZE is 100 and MAX_COUNT is 10.

In Example 1, it is assumed that a current cursor domain set is {[5, 101)}, and the numbering of a revived message is 6. The message 6 has am upper-bound cursor domain [5, 101), the message 6 is included in the upper-bound cursor domain [5, 101). In this case, the cursor domain set is no longer adjusted, and the cursor domain set is still {[5, 101)} after the message 6 is revived.

In Example 2, it is assumed that a current cursor domain set is {[11, 101)}, and the numbering of a revived message is 6. The message 6 has an upper-bound cursor domain [11, 101), the left endpoint message numbering 11 of the upper-bound cursor domain [11, 101) is greater than 6, and there is no precursor cursor domain. In this case, a cursor domain

[6, 7) can be added to the cursor domain set, and the cursor domain set is {[6, 7), [11, 101)} after the message 6 is revived.

In Example 3, it is assumed that a current cursor domain set is {[3, 6), [11, 101)}, and the numbering of a revived message is 6. The message 6 has an upper-bound cursor domain [11, 101) and a precursor cursor domain [3, 6). In a cursor domain [3, 7) and a cursor domain [6, 101), the domain which has a smaller range and does not exceed MAX_RANGE_SIZE is [3, 7). In this case, the cursor [3, 7) can be added to the cursor domain set to replace the cursor domain [3, 6), and the cursor domain set is {[3, 7), [11, 101)} after the message 6 is revived.

In Example 4, it is assumed that a current cursor domain set is {[1, 101), [106, 206)}, and the numbering of a revived message is 103. The message 103 has an upper-bound cursor domain [106, 206) and a precursor cursor domain [1, 101). However, the ranges of a cursor domain [1, 104) and a cursor domain [103, 206) both exceed MAX_RANGE_SIZE (MAX_RANGE_SIZE is assumed to be 100). In this case, the cursor domain [3, 7) can be added to the cursor domain set, and the cursor domain set is {[1, 101), [103, 104), [106, 206)} after the message 103 is revived.

Therefore, when a message in a message queue fails to be consumed, the number range can be expanded, so that the numbering of the message that fails to be consumed is included in the number range. This can include one of the following four situations. In these four situations, a numbering of a revived message is MsgID.

In a first situation, when an upper-bound cursor domain of the message MsgID exists in a current cursor domain set and the MsgID is included in the upper-bound cursor domain, the current cursor domain set can remain unchanged.

In a second situation, when an upper-bound cursor domain of the message MsgID exists in a current cursor domain set, a precursor cursor domain of the message MsgID does not exist in the current cursor domain set, and a head message numbering of the upper-bound cursor domain s greater than MsgID, the cursor domain [MsgID, MsgID+1) can be added to the current cursor domain set.

In a third situation, when an upper-bound cursor domain [UB, UE) and a precursor cursor domain [PB, PE) of the message MsgID exist in a current cursor domain set, and one or both of an expanded precursor cursor domain [PB, MsgID+1) and an expanded upper-bound cursor domain [MsgID, UE) is/are less than a preset second threshold, a cursor domain having a smaller range in the two cursor domains can be selected to replace the corresponding original cursor domain. In the case where the scale of the current cursor domain set reaches the upper limit and the upper-bound cursor domain [UB, UE) is the maximum cursor domain the current cursor domain set, the expanded precursor cursor domain [PB, MsgID+1) can be selected to replace the precursor cursor domain [PB, PE).

In a third situation, when an upper-bound cursor domain [UB, UE) and a precursor cursor domain [PB, PE) of the message MsgID exist in a current cursor domain set, and both an expanded precursor cursor domain [PB, MsgID+1) and an expanded upper-bound cursor domain [MsgID, UE) are less than a preset second threshold, a cursor domain [MsgID, MsgID+1) can be added to the current cursor domain set.

In some embodiments of the present disclosure, adjusting the number range and managing the messages according to status changes of the messages in the message queue can further include: deleting, in the case where a client terminal successfully consumes a message, the successfully consumed message from the message queue. The deleting indicates deleting the message from a disk where the message queue is stored, that is, deleting the message from the message queue.

In some embodiments of the present disclosure, adjusting the number range and managing the messages according to status changes of the messages in the message queue can further include: deleting, after a message is pre-read to a cache from the message queue, a non-maximum number interval from the number range in the case where all consumable messages corresponding to the non-maximum number interval in the number range have been pre-read.

After such a non-maximum number interval is deleted, the quantity of number intervals in the number range can be decreased, the number intervals can be searched for less times, thus shortening a time for querying the number range and further increasing a message pre-reading message.

To further manage the number range, a version number and a version number updating rule can be set for the number range. For example, an initial version number of the number range can be set to be 1. And each time the number range is modified, the version number of the number range can be increased by 1. If a number interval needs to be modified when the number range is modified, a version number of the modified number range is used as a version number of the number interval. It is necessary to ensure that a number interval is not modified when the number interval is deleted, that is, the version number of the number interval does not change; otherwise, the number interval cannot be deleted.

The message management method according to embodiments of the present disclosure can manage numberings of consumable messages in a message queue through a number range, and ensure a first-in-first-out characteristic of the messages. When a batch of messages is pre-read to a cache, numbers of a set quantity of consumable messages with minimum numberings in a message queue can be quickly found according to the number range, which increases the message pre-reading speed and improves performance of a message system while ensuring the first-in first-out characteristic of the messages.

Embodiments of the present disclosure further provide a message management apparatus configured to implement the foregoing message management method. The description about the principle in the embodiment of the message management method is also applicable to the following embodiments of the message management apparatus.

Figure 4:
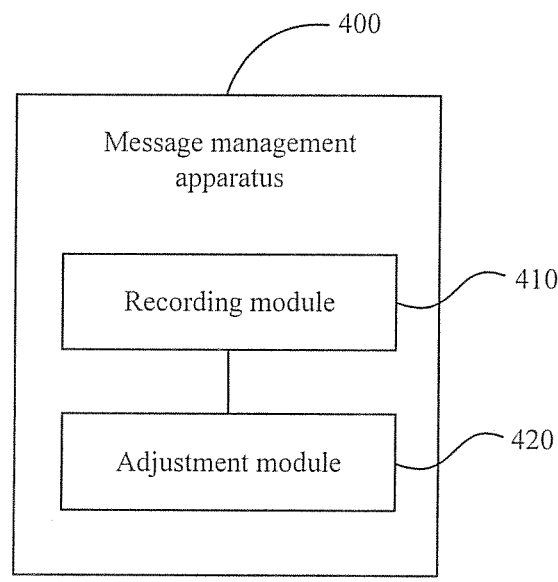
FIG. 4 is a structural block diagram of an exemplary message management apparatus, according to some embodiments of the disclosure.

FIG. 4 is a structural block diagram of an exemplary message management apparatus 400, according to some embodiments of the disclosure. As shown in FIG. 4, message management apparatus 400 can include a recording module 410 and an adjustment module 420. Recording module 410 can be configured to record, in a memory, a number range of consumable messages in a message queue. Adjustment module 420 can be configured to adjust the number range recorded by recording module 410 and manage the messages according to status changes of the messages in the message queue.

The number range can include at least one number interval, and any two number intervals do not overlap with each other. As the number range of consumable messages is recorded according to a sequence of message numberings, the first-in-first-out characteristic of the messages can be ensured. The number range of the consumable messages can be used as a basis for querying a batch of messages to be pre-read. Through the number range of the consumable messages, a batch of messages to be pre-read to a cache can be found quickly, and the first-in-first-out characteristic of the messages can also be ensured.

Number intervals in the number range can be arranged in an ascending order of interval right endpoint message numberings.

In some embodiments of the present disclosure, adjustment module 420 can include a narrowing unit. The narrowing unit is configured to narrow the number range after a message in the message queue pre-read to a cache is removed from the cache and is consumed by a client terminal, to remove the numbering of the removed message from the number range, and to mark the removed message as an inconsumable message in the message queue.

In some embodiments of the present disclosure, adjustment module 420 can include an expanding unit. The expanding unit is configured to expand the number range in the case where a client terminal does not return a consumption result within a given period of time, so that the numbering of a message whose consumption result is not returned within a given period of time is included in the number range, and to mark the message whose consumption result is not returned within a given period of time as a consumable message in the message queue.

In some embodiments of the present disclosure, adjustment module 420 can include a message deleting unit. The message deleting unit is configured to delete, the case where a client terminal successfully consumes a message, the successfully consumed message from the message queue.

In embodiments of the present disclosure, adjustment module 420 can include an interval deleting unit. The interval deleting unit is configured to delete, after a message is pre-read to a cache from the message queue, a non-maximum number interval from the number range in the case where all consumable messages corresponding to the non-maximum number interval in the number range have been pre-read.

The message management apparatus according to the embodiment of the present disclosure manages numberings of consumable messages in a message queue through a number range and ensures a first-in-first-out characteristic of the messages. When it is necessary to pre-read a batch of messages to a cache, numbers of a set quantity of consumable messages with minimum numberings in a message queue can be quickly found according to the number range, which increases a message pre-reading speed and improves performance of a message system while ensuring the first-in first-out characteristic of the messages.

Figure 5:
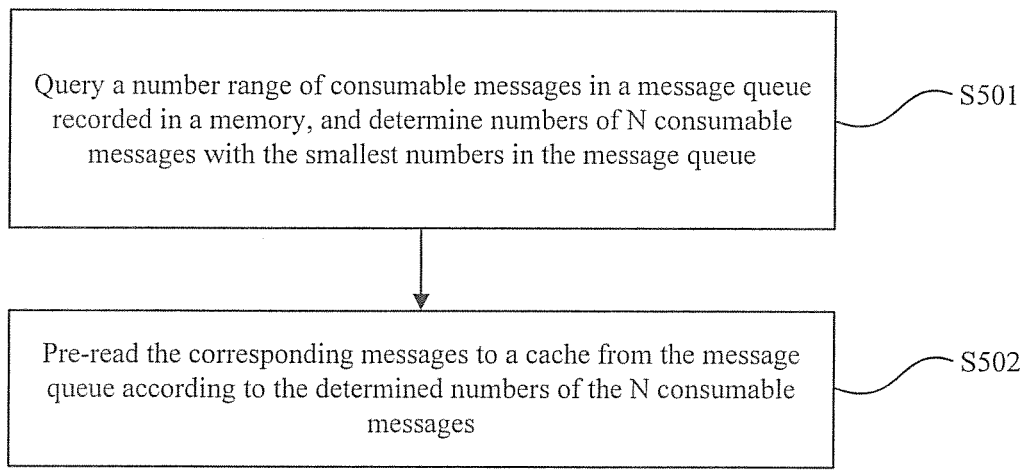
FIG. 5 is a flowchart of an exemplary message pre-reading method, according to some embodiments of the disclosure.

FIG. 5 is a flowchart of an exemplary message pre-reading method, according to some embodiments of the disclosure. As shown in FIG. 5, the message pre-reading method can include steps S501 and S502.

In step S501, a number range of consumable messages in a message queue recorded in a memory can be queried, and numbers of N consumable messages with the smallest numbers in the message queue can be determined, N being a natural number. The number range can include at least one number interval, and any two number intervals do not overlap with each other. The number range of the consumable messages in step S501 is the same as the number range in the foregoing message management method. The number range of the consumable messages can be used as a basis for querying a batch of messages to be pre-read. Through the number range of the consumable messages, a batch of messages to be pre-read to a cache can be found quickly, and a first-in-first-out characteristic of the messages can be ensured.

In some embodiments of the present disclosure, the number range can include at least one number interval, number intervals in the number range can be arranged in an ascending order of interval right endpoint message numberings, and any two number intervals in the number range do not overlap with each other. In this disclosure, such a number range can be referred to as a cursor domain set, and a number interval in such a number range can be referred to as a cursor domain. A cursor domain is expressed by a left closed and right open interval.

In step S502, a message can be pre-read to a cache from the message queue according to the determined numberings of the N consumable messages. The N consumable messages include minimum numberings in the message queue, ensuring the first-in-first-out characteristic of the messages.

The message pre-reading method of the present disclosure is further described below through two specific examples.

In a first example, it is assumed that a number range of consumable messages in a message queue that is recorded in a memory according to a sequence of message numberings is {[6, 9), [11, 101)}, and none of the messages in the number range is a message marked as DELETED. Then a process of pre-reading 5 consumable messages from the message queue to a cache is: querying the number range {[6, 9), [11, 101)} to determine that numberings of 5 consumable messages with minimum numbers are 6, 7, 8, 11, and 12; and pre-reading message 6, message 7, message 8, message 11, and message 12 from the message queue to the cache.

Here, it should be noted that the messages marked as DELETED are messages that have been successfully consumed. Such messages are not consumable messages, but numberings of the messages may be included in the number range of the consumable messages. This requires excluding the numberings of the messages marked as DELETED when numberings of pre-read messages are determined according to the number range. Please refer to the following example 2 for such a situation.

In a second example, it is still assumed that a number range of consumable messages in a message queue that is recorded in a memory according to a sequence of message numberings is {[6, 9), [11, 101)}, and message 7 in the number range is a message marked as DELETED. Then a process of pre-reading 5 consumable messages from the message queue to a cache is: querying the number range{[6, 9), [11, 101)} to determine that numberings of 5 consumable messages with minimum numbers are 6, 8, 11, 12, and 13 (as message 7 is a message marked as DELETED, the numbering 7 is excluded); and pre-reading message 6, message 8, message 11, message 12, and message 13 from the message queue to the cache.

The message pre-reading method according to the embodiments of the present disclosure can quickly find numberings of a set quantity of consumable messages with minimum numbers in a message queue according to a number range of the consumable messages in the message queue that is recorded in the memory. Moreover, they and further ensures a first-in-first-out characteristic of the messages, increases a message pre-reading speed, and improves performance of a message system.

Embodiments of the present disclosure further provide a message pre-reading apparatus configured to implement the foregoing message pre-reading method. The description about the principle in the embodiment of the message pre-reading method is also applicable to the following embodiments of the message pre-reading apparatus.

Figure 6:
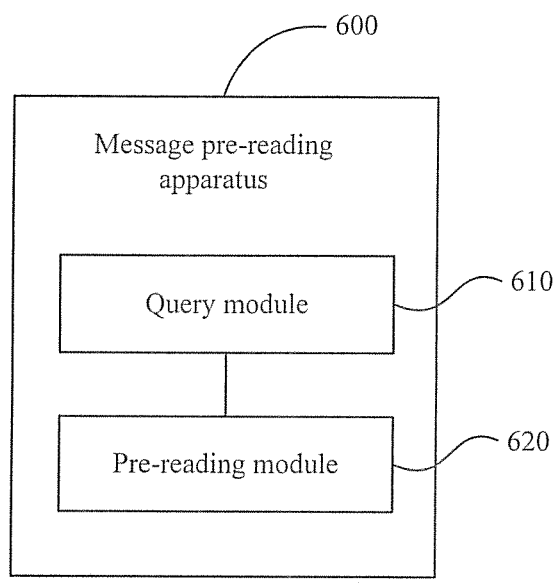
FIG. 6 is a structural block diagram of an exemplary message pre-reading apparatus, according to some embodiments of the disclosure.

FIG. 6 is a structural block diagram of an exemplary message pre-reading apparatus 600, according to embodiments of the disclosure. As shown in FIG. 6, message pre-reading apparatus 600 can include a query module 610 and a pre-reading module 620. Query module 610 is configured to query a number range of consumable messages in a message queue recorded in a memory and to determine numberings of N consumable messages with the smallest numbers in the message queue, N being a natural number. Pre-reading module 620 is configured to pre-read the corresponding messages to a cache from the message queue according to the numberings of the N consumable messages determined by query module 610.

The number range of the consumable messages is the same as the number range in the foregoing message management method. The number range can include at least one number interval, and any two number intervals do not overlap with each other. As the number range of the consumable messages is recorded according to a sequence of message numberings, a first-in-first-out characteristic of the messages can be ensured. The number range of the consumable messages can be used as a basis for querying a batch of messages to be pre-read. Through the number range of the consumable messages, a batch of messages to be pre-read to a cache can be found quickly, and the first-in-first-out characteristic of the messages can also be ensured.

In some embodiments of the present disclosure, the number range can include at least one number interval, number intervals in the number range can be arranged in an ascending order of interval right endpoint message numberings, and any two number intervals in the number range do not overlap with each other. In this text, such a number range can be referred to as a cursor domain set, and a number interval in such a number range can be referred to as a cursor domain. A cursor domain is expressed by a left closed and right open interval.

The message pre-reading apparatus according to the embodiment of the present disclosure can quickly find numberings of a set quantity of consumable messages with minimum numbers in a message queue according to a number range of the consumable messages in the message queue that is recorded in the memory, and further ensures a first-in-first-out characteristic of the messages, increases a message pre-reading speed, and improves performance of a message system.

Figure 7:
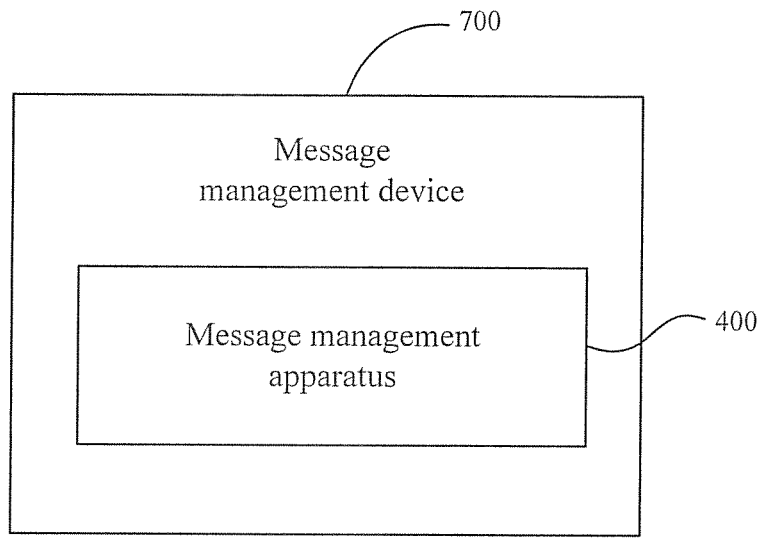
FIG. 7 is a structural block diagram of an exemplary message management device, according to some embodiments of the disclosure.

FIG. 7 is a structural block diagram of an exemplary message management device 700, according to some embodiments of the disclosure. As shown in FIG. 7, the message management device 700 can include a message management apparatus 400. The message management apparatus 400 can be any message management apparatus in the foregoing message management apparatus embodiments.

Message management apparatus 400 can be configured to record, in a memory, a number range of consumable messages in a message queue, wherein the number range includes at least one number interval, and any two number intervals do not overlap with each other; and adjust the number range and manage the messages according to status changes of the messages in the message queue.

The message management device according to the embodiment of the present disclosure manages numbers of consumable messages in a message queue through a number range and ensures a first-in-first-out characteristic of the messages. When a batch of messages is pre-read to a cache, numbers of a set quantity of consumable messages with minimum numbers in a message queue can be quickly found according to the number range, which increases a message pre-reading speed and improves performance of a message system while ensuring the first-in first-out characteristic of the messages.

Figure 8:
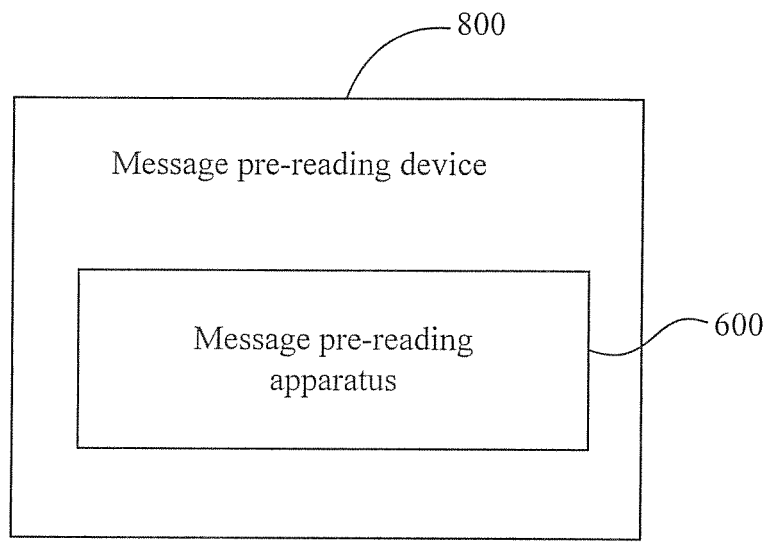
FIG. 8 is a structural block diagram of an exemplary message pre-reading device, according to some embodiments of the disclosure.

FIG. 8 is a structural block diagram of an exemplary message pre-reading device 800, according to some embodiments of the disclosure. As shown in FIG. 8, message pre-reading device 800 can include a message pre-reading apparatus 600. Message pre-reading apparatus 600 can be any message pre-reading apparatus in the foregoing message pre-reading apparatus embodiments.

Message pre-reading apparatus 600 can be configured to query a number range of consumable messages in a message queue recorded in a memory and to determine numberings of N consumable messages with the smallest numbers in the message queue, N being a natural number. Message pre-reading apparatus 600 can also be configured to pre-read the corresponding messages to a cache from the message queue according to the determined numbers of the N consumable messages. The number range can include at least one number interval, and any two number intervals do not overlap with each other.

The message pre-reading device can quickly find numberings of a set quantity of consumable messages with minimum numbers in a message queue according to a number range of the consumable messages in the message queue recorded in the memory. It can ensure a first-in-first-out characteristic of the messages, increase a message pre-reading speed, and improve performance of a message system.

Figure 9:
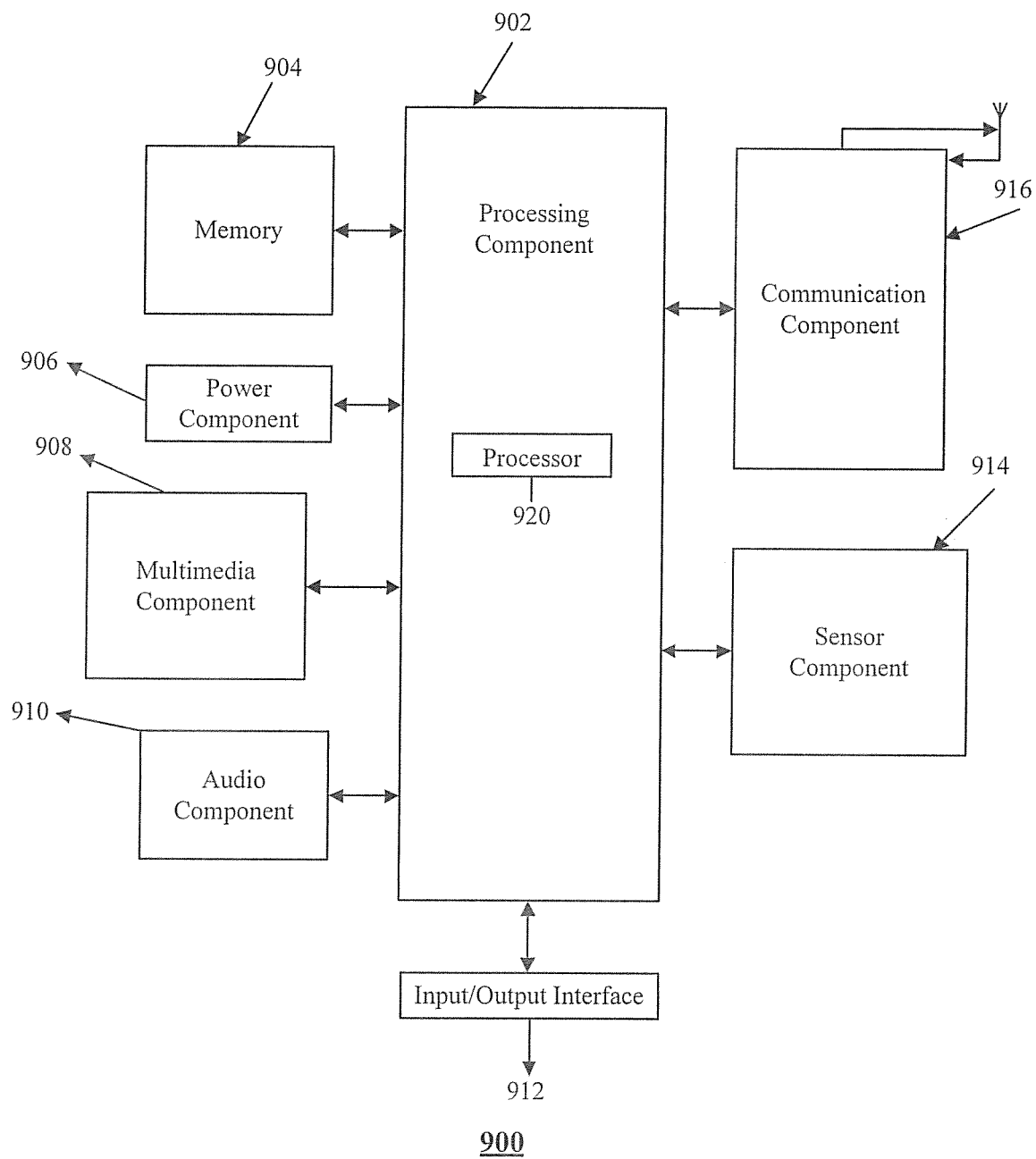
FIG. 9 is a structural block diagram of an exemplary device, according to some embodiments of the disclosure.

FIG. 9 is a structural block diagram of a device 900, according to embodiments of the disclosure. As shown in FIG. 9, device 900 can be a mobile phone, a computer, a digital broadcast terminal, a message sending and receiving device, a game console, a tablet device, a medical facility, a fitness facility, a personal digital assistant, or the like.

Referring to FIG. 9, device 900 can include the following one or more components: a processing component 902, a memory 904, a power component 906, a multimedia component 908, an audio component 910, all input/output (I/O) interface 912, a sensor component 914, and a communication component 916.

Processing component 902 can control overall operations of control device 900, for example, operations associated with display, a phone call, data communication, a camera operation, and a record operation. Processing component 902 can include one or more processors 920 to execute instructions, so as to perform all or some of the steps of the foregoing method. The steps can include: recording, in a memory, a number range of consumable messages in a message queue; adjusting the number range and managing the messages according to status changes of the messages in the message queue; querying the number range of the consumable messages in the message queue recorded in the memory, and determining numberings of N consumable messages with the smallest numbers in the message queue, N being a natural number; and pre-reading the corresponding messages to a cache from the message queue according to the determined numberings of the N consumable messages.

Processing component 902 can include one or more modules to facilitate interaction between processing component 902 and other components. For example, processing component 902 can include a multimedia module to facilitate interaction between multimedia component 908 and processing component 902.

Memory 904 can be configured to store various types of data to support operations in device 900. Examples of the data include an instruction of any application program or method, contact data, address book data, a message, a picture, a video, and the like used to be operated on device 900. Memory 904 can be implemented by any type of volatile or non-volatile storage devices or their combinations, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

Power component 906 can supply power for various components of device 900. Power component 906 can include a power management system, one or more power sources, and other components associated with power generation, management, and distribution for device 900.

Multimedia component 908 can include a screen that provides an output interface between device 900 and a user. In some embodiments, the screen can include a liquid crystal display (LCD) and a touch panel (TP). If the screen includes a TP, the screen can be implemented as a touch screen to receive an input signal from the user. The TP includes one or more touch sensors to sense a touch, a slide, and a gesture on the TP. The TP not only can sense the boundary of a touch or slide action but also can detect the duration and pressure related to the touch or slide operation. In some embodiments, multimedia component 908 includes a front camera and/or a rear camera. When device 900 is in an operating mode, such as a shooting mode or a video mode, the front camera and/or the rear camera can receive external multimedia data. Each front camera and rear camera can be a fixed optical lens system or have focusing and optic zoom capabilities.

Audio component 910 can be configured to output and/or input an audio signal. For example, audio component 910 includes a microphone (MIC). When device 900 is in an operating mode, such as a calling mode, a recording mode, and a speech recognition mode, the MIC is configured to receive an external audio signal. The received audio signal can be further stored in memory 904 or sent by using communication component 916. In some embodiments, audio component 910 further includes a loudspeaker configured to output an audio signal.

I/O interface 912 can provide an interface between processing component 902 and a peripheral interface module. The peripheral interface module can be a keyboard, a click wheel, buttons, and the like. The buttons can include, but are not limited to, a home button, a volume button, a start button, and a lock button.

Sensor component 914 can include one or more sensors configured to provide state evaluation of various aspects for device 900. For example, sensor component 914 can detect an on/off state of device 900 and can detect relative positioning of components. For example, the components are a display and a small keyboard of the device 900. Sensor component 914 can further detect a position change of device 900 or a component of device 900, whether or not a user is in contact with device 900, the orientation or acceleration/deceleration of device 900, and a temperature change of device 900. Sensor component 914 can include a proximity sensor configured to detect the presence of an object nearby without any physical contact. Sensor component 914 can further include an optical sensor, such as a CMOS or CCD image sensor configured to be used in an imaging application. In some embodiments, the sensor component 914 can further include an acceleration sensor, a gyroscope sensor, a magnetic sensor, a pressure sensor, or a temperature sensor.

Communication component 916 can be configured to facilitate wired or wireless communication between device 900 and other devices. Device 900 can access a wireless network based on a communications standard, for example, WiFi, 2G, 3G or their combination. In some embodiments, communication component 916 can receive a broadcast signal or broadcast-related information from an external broadcast management system via a broadcast channel. In some embodiments, communication component 916 can further include a near-field communication (NFC) module to facilitate near field communication. For example, the NFC module can be implemented based on a radio frequency identification (RFID) technology, an Infrared Data Association (IrDA) technology, an ultra-wideband (UWB) technology, a Bluetooth (BT) technology, and other technologies.

In some embodiments, device 900 can be implemented by one or more application-specific integrated circuits (ASICs), a digital signal processor (DSP), a digital signal processing device (DSPD), a programmable logic device (PLD), a field programmable gate array (FPGA), a controller, a microcontroller, a microprocessor or other electronic elements, and is configured to execute the foregoing method.

In some embodiments, a non-temporary computer readable storage medium including an instruction is further provided. For example, the non-temporary computer readable storage medium can be a memory 904 including an instruction. The instruction can be executed by processor 920 of device 900 to complete the foregoing method. For example, the non-temporary computer readable storage medium can be a ROM, a random access memory (RAM), a CD-ROM, a magnetic tape, a floppy disk, an optical data storage device, and so on.

Embodiments of the disclosure further provide a non-transitory computer readable storage medium. When an instruction in the storage medium is executed by a processor of a mobile terminal, the mobile terminal can execute a method, wherein the method includes: recording, in a memory, a number range of consumable messages in a message queue; adjusting the number range and managing the messages according to status changes of the messages in the message queue; querying the number range of the consumable messages in the message queue recorded in the memory, and determining numberings of N consumable messages with the smallest numbers in the message queue, N being a natural number; and pre-reading the corresponding messages to a cache from the message queue according to the determined numberings of the N consumable messages.

Described above are merely preferred embodiments of the present disclosure, which are not intended to limit the present disclosure. Any modification, equivalent replacement, improvement and the like made within the spirit and principle of the present disclosure should be included in the protection scope of the present disclosure.

What is claimed is:

1. A message management method, comprising:
   recording, in a memory, a number range of consumable messages in a message queue, wherein the number range includes numberings of the consumable messages; and
   adjusting the number range and managing the messages according to status changes of the messages in the message queue, wherein adjusting the number range is one of narrowing the number range by removing a numbering of one of the messages or expanding the number range by including, from the beginning to the end of the number range, a numbering of one of the messages, wherein adjusting the number range and managing the messages according to status changes of the messages in the message queue comprises:

reading a message to a cache from the message queue;

determining a non-maximum number interval from the number range;

determining whether all consumable messages in the non-maximum number interval have been read; and deleting the non-maximum number interval from the number range in response to the determination of all consumable messages in the non-maximum number interval having been read.

2. The message management method according to claim 1, wherein the number range comprises a plurality of number intervals, and any two of the plurality of number intervals do not overlap with each other.

3. The message management method according to claim 2, wherein each of the number intervals of the plurality of number intervals includes a right endpoint message numbering and a left endpoint message numbering, and the plurality of number intervals are arranged in an ascending order of the right endpoint message numberings.

4. The message management method according to claim 1, wherein adjusting the number range and managing the messages according to status changes of the messages in the message queue comprises:

reading a message in the message queue to a cache;

removing the message from the cache for consumption by a client terminal;

narrowing the number range after the message is removed from the cache;

removing a numbering of the removed message from the number range; and marking the removed message as an inconsumable message in the message queue.

5. The message management method according to claim 1, wherein adjusting the number range and managing the messages according to status changes of the messages in the message queue comprises:

determining whether a client terminal returns a consumption result of a message within a period of time;

in response to the determination of the client terminal failing to return the consumption result of the message within the period of time, expanding the number range to include a numbering of the message; and marking the message as a consumable message in the message queue.

6. The message management method according to claim 1, wherein adjusting the number range and managing the messages according to status changes of the messages in the message queue comprises:

determining whether a client terminal consumes a message; and in response to the determination of the client terminal consuming the message, removing the consumed message from the message queue.

7. A message management apparatus, comprising:
a memory storing a set of instructions; and
a processor configured to execute the set of instructions to cause the message management apparatus to perform:

recording, in the memory, a number range of consumable messages in a message queue, wherein the number range includes numberings of the consumable messages; and adjusting the recorded number range and managing the messages according to status changes of the messages in the message queue, wherein adjusting the number range is one of narrowing the number range by removing a numbering of one of the messages or expanding the number range by including, from the beginning to the end of the number range, a numbering of one of the messages, wherein adjusting the number range and managing the messages according to status changes of the messages in the message queue comprises:

reading a message to a cache from the message queue;

determining a non-maximum number interval from the number range;

determining whether all consumable messages in the non-maximum number interval have been read; and deleting the non-maximum number interval from the number range in response to the determination of all consumable messages in the non-maximum number interval having been read.

8. The message management apparatus according to claim 7, wherein the number range comprises a plurality of number intervals, and any two of the plurality of number intervals do not overlap with each other.

9. The message management apparatus according to claim 8, wherein each of the number interval includes a right endpoint message numbering and a left endpoint message numbering, and the number intervals are arranged in an ascending order of the right endpoint message numberings.

10. The message management apparatus according to claim 7, wherein adjusting the recorded number range and managing the messages according to status changes of the messages in the message queue comprises:

reading a message in the message queue to a cache;

removing the message from the cache for consumption by a client terminal;

narrowing the number range after the message is removed from the cache;

removing a numbering of the removed message from the number range; and marking the removed message as an inconsumable message in the message queue.

11. The message management apparatus according to claim 7, wherein adjusting the recorded number range and managing the messages according to status changes of the messages in the message queue comprises:

determining whether a client terminal returns a consumption result of a message within a period of time;

in response to the determination of the client terminal failing to return the consumption result of the message within the period of time, expanding the number range to include a numbering of the message; and marking the message as a consumable message in the message queue.

12. The message management apparatus according to claim 7, wherein adjusting the recorded number range and managing the messages according to status changes of the messages in the message queue comprises:
  determining whether a client terminal consumes a message; and
  in response to the determination of the client terminal consuming the message, deleting the consumed message from the message queue.

13. The method of claim 1, further comprising:
  querying the number range of consumable messages in a message queue recorded in a memory;
  determining, among the consumable messages, a plurality of selected consumable messages, wherein the selected consumable messages include smaller numberings than other consumable messages in the message queue; and
  reading the selected consumable messages to a cache from the message queue according to the numberings of the selected consumable messages.

14. The apparatus of claim 7, wherein the processor is further configured to execute the set of instructions to cause the apparatus to:
  query the number range of consumable messages in a message queue;
  determine, among the consumable messages, a plurality of selected consumable messages, wherein the selected consumable messages include smaller numberings than other consumable messages in the message queue; and
  read the selected consumable messages to a cache from the message queue according to the numberings of the selected consumable messages.

15. A non-transitory computer readable medium that stores a set of instructions that is executable by at least one processor of a computer system to cause the computer system to perform a message management method, the method comprising:
  recording, in a memory, a number range of consumable messages in a message queue, wherein the number range includes numbers of the consumable messages; and
  adjusting the number range and managing the messages according to status changes of the messages in the message queue, wherein adjusting the number range is one of narrowing the number range by removing a numbering of one of the messages or expanding the number range by including, from the beginning to the end of the number range, a numbering of one of the messages,
  wherein adjusting the number range and managing the messages according to status changes of the messages in the message queue comprises:
    reading a message to a cache from the message queue;
    determining a non-maximum number interval from the number range;
    determining whether all consumable messages in the non-maximum number interval have been read; and
    deleting the non-maximum number interval from the number ran eg in response to the determination of all consumable messages in the non-maximum number interval having been read.

16. The non-transitory computer readable medium according to claim 15, wherein the number range comprises a plurality of number intervals, and any two of the plurality of number intervals do not overlap with each other.

17. The non-transitory computer readable medium according to claim 16, wherein each of the number interval includes a right endpoint message numbering and a left endpoint message numbering, and the number intervals are arranged in an ascending order of the right endpoint message numberings.

18. The non-transitory computer readable medium according to claim 15, wherein adjusting the number range and managing the messages according to status changes of the messages in the message queue comprises:
  reading a message in the message queue to a cache;
  removing the message from the cache for consumption by a client terminal;
  narrowing the number range after the message is removed from the cache;
  removing a numbering of the removed message from the number range; and
  marking the removed message as an inconsumable message in the message queue.

19. The non-transitory computer readable medium according to claim 15, wherein adjusting the number range and managing the messages according to status changes of the messages in the message queue comprises:
  determining whether a client terminal returns a consumption result of a message within a period of time;
  in response to the determination of the client terminal failing to return the consumption result of the message within the period of time, expanding the number range to include a numbering of the message; and
  marking the message as a consumable message in the message queue.

20. The non-transitory computer readable medium according to claim 15, wherein adjusting the number range and managing the messages according to status changes of the messages in the message queue comprises:
  determining whether a client terminal consumes a message; and
  in response to the determination of the client terminal consuming the message, deleting the consumed message from the message queue.

21. The non-transitory computer readable medium according to claim 15, wherein the set of instructions that is executable by the at least one processor of the computer system to cause the computer system to perform:
  querying a number range of consumable messages in a message queue;
  determining, among the consumable messages, a plurality of selected consumable messages, wherein the selected consumable messages include smaller numberings than other consumable messages in the message queue; and
  reading the selected consumable messages to a cache from the message queue according to the numberings of the selected consumable messages.

* * * * *